United States Patent
Wang

(10) Patent No.: US 8,760,589 B2
(45) Date of Patent: Jun. 24, 2014

(54) RETENTION OF A REPLACEABLE PART WITHIN A DEVICE

(75) Inventor: Jiaxian Wang, Richmond (CA)

(73) Assignee: Seiko Epson Corporation, Tokyo (JP)

(*) Notice: Subject to any disclaimer, the term of this patent is extended or adjusted under 35 U.S.C. 154(b) by 1412 days.

(21) Appl. No.: 12/114,762

(22) Filed: May 3, 2008

(65) Prior Publication Data

US 2008/0273127 A1   Nov. 6, 2008

Related U.S. Application Data

(60) Provisional application No. 60/927,781, filed on May 3, 2007.

(51) Int. Cl.
*H04N 5/645* (2006.01)

(52) U.S. Cl.
USPC ............... 348/825; 348/836; 348/E5.128

(58) Field of Classification Search
CPC ........ F21V 21/04; F21V 17/04; F21V 19/00; F21S 8/02; F21S 48/1118; F21S 48/155; H04N 5/645
USPC ............. 348/836, 825, 826, 828, E5.128, 348/E5.129; 267/150; 312/10.1; 353/119; 362/255, 377, 417, 444
See application file for complete search history.

(56) References Cited

U.S. PATENT DOCUMENTS

| | | | | |
|---|---|---|---|---|
| 2,103,322 A * | 12/1937 | De Sherbinin | ................ | 362/444 |
| 2,530,360 A * | 11/1950 | Price | .............................. | 362/255 |
| 2,616,030 A * | 10/1952 | Van Dyke | ..................... | 362/255 |
| 2,878,374 A * | 3/1959 | Sleichert et al. | ............. | 362/455 |
| 3,318,999 A * | 5/1967 | Taylor | ........................... | 348/826 |
| 3,398,238 A * | 8/1968 | Siebold | ......................... | 348/826 |
| 4,390,931 A * | 6/1983 | Gorick et al. | ................. | 362/267 |
| 4,431,151 A * | 2/1984 | Schonasky | ................... | 248/27.1 |
| 4,760,510 A * | 7/1988 | Lahti | ............................ | 362/365 |
| 5,567,041 A * | 10/1996 | Slocum | ........................ | 362/148 |
| 5,651,603 A * | 7/1997 | Doring | ......................... | 362/519 |
| 6,164,802 A * | 12/2000 | Gromotka | ..................... | 362/375 |
| 6,250,790 B1 * | 6/2001 | Montet | ......................... | 362/549 |
| 6,896,394 B2 * | 5/2005 | Houle | ........................... | 362/365 |
| 7,296,907 B2 * | 11/2007 | Targetti | ........................ | 362/147 |
| 2002/0191121 A1 * | 12/2002 | Fleetwood et al. | ........... | 348/818 |
| 2006/0087835 A1 * | 4/2006 | Sevack et al. | ................. | 362/147 |

* cited by examiner

*Primary Examiner* — Branon Painter
(74) *Attorney, Agent, or Firm* — Oliff PLC

(57) ABSTRACT

Systems for retaining a replaceable part within an image display device are provided herein. One example includes a first retaining member with a first looped retention arm configured to apply a retaining force in an x-direction to the replaceable part and a second retaining member with a second looped retention arm configured to apply a retaining force in a y-direction to the replaceable part. Upon displacement of the replaceable part from an engagement position to a displacement position, a normal force as applied by one of the first retaining member and the second retaining member is reduced and the force to push the replaceable part towards the engagement position is increased.

15 Claims, 9 Drawing Sheets

RETENTION OF A REPLACEABLE PART WITHIN A DEVICE

CROSS-REFERENCE TO RELATED APPLICATION

This patent application claims the benefit of priority to an earlier filed and commonly owned U.S. Provisional Patent Application No. 60/927,781 filed on May 3, 2007, the content of which is hereby incorporated by reference in its entirety for all purposes.

TECHNICAL FIELD

The present disclosure relates to the mechanical retention of a replaceable part within a device, specifically retention of a lamp within an image display device.

BACKGROUND

Image display devices, also referred to herein as display devices, may be used in a variety of environments. For example, image display devices, including, but not limited to televisions, monitors, and projectors may be adapted to display images, including text, graphics, video images, still images, presentations, etc. Such display devices may be found in home environments and applications, education environment and applications, business facilities, conference rooms and other meeting facilities, etc. The following is a non-exhaustive list of exemplary display devices: cathode ray tubes (CRTs), projectors, flat panel liquid crystal displays (LCDs) systems, light emitting diode (LED) systems, plasma systems, front projection systems, rear projection systems, LCD monitors, etc. Large format display devices may include but are not limited to televisions, front-projection systems, and rear-projections systems.

The images or content displayed on the image display devices may be provided by a plurality of different content sources. For example, content may be provided by content sources or remote computing devices, including, but not limited to, computers, laptop computers, personal computers, storage mediums, such as memory cards and other memory devices, cameras, telephones, smartphones, portable data assistants, etc. Image data from the content source may be transmitted to the display device directly or through a network. The content source may be connected, e.g. wired or wirelessly, to the image device for display of the content.

Typically, image display devices include a light assembly, including one or more light sources, such as a lamp, may be linked to a light engine or optical engine. Light may be directed from the light assembly through the light engine, and then through one or more projection lens to a display surface, such as a screen.

The image display device may have numerous components which are not permanently attached to the device. For example, some of the components may be replaceable parts, such as the light source. These replaceable parts may be subject to displacement during movement of the image display device. Retention systems may be such that movement may result in stress on the replaceable part which may result in replacement of the part more frequently.

SUMMARY

Systems for retaining a replaceable part within an image display device are provided herein. One example includes a first retaining member with a first looped retention arm configured to apply a retaining force in an x-direction to the replaceable part and a second retaining member with a second looped retention arm configured to apply a retaining force in a y-direction to the replaceable part. Upon displacement of the replaceable part from an engagement position to a displacement position, a normal force as applied by one of the first retaining member and the second retaining member is reduced and the force to push the replaceable part towards the engagement position is increased.

DETAILED DESCRIPTION OF THE DEPICTED EMBODIMENTS

Figure 1:
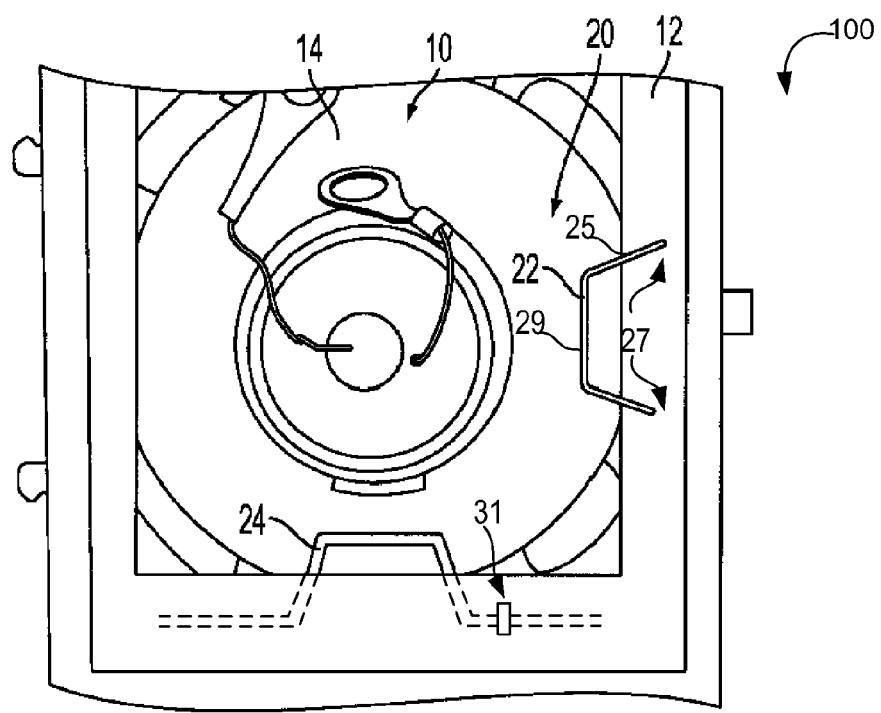
FIG. 1 is a top view of an embodiment of a retaining system for retaining a replaceable part within a device.
Figure 2:
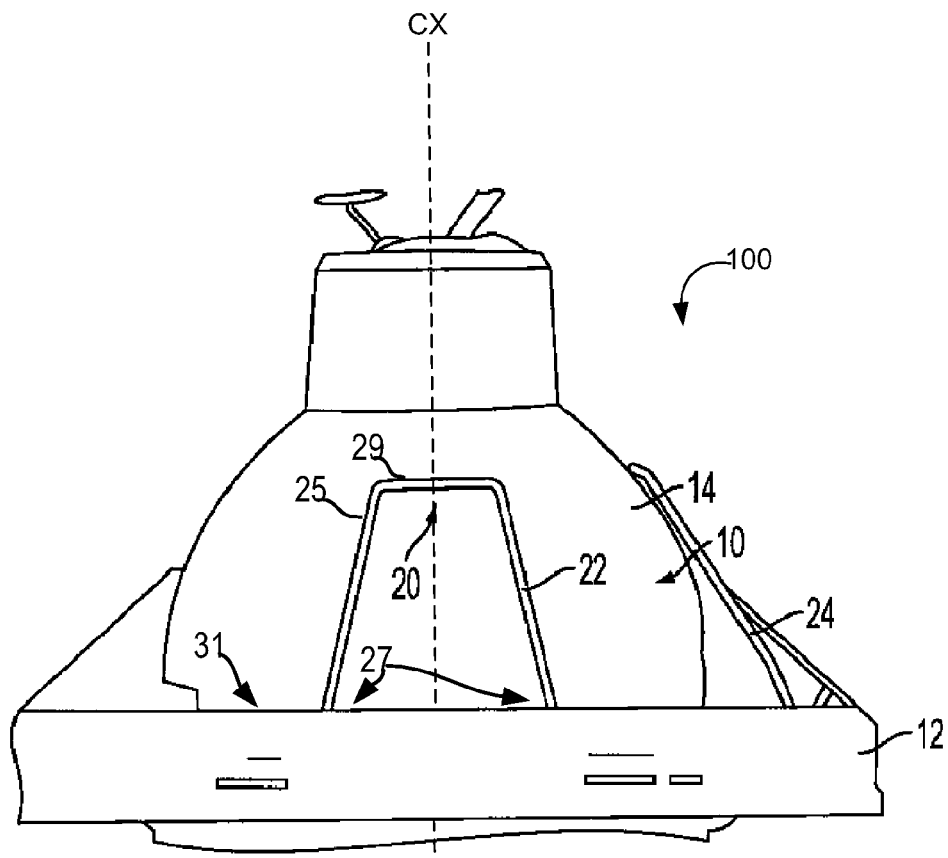
FIG. 2 is a side perspective view of an embodiment of the retaining system.
Figure 3:
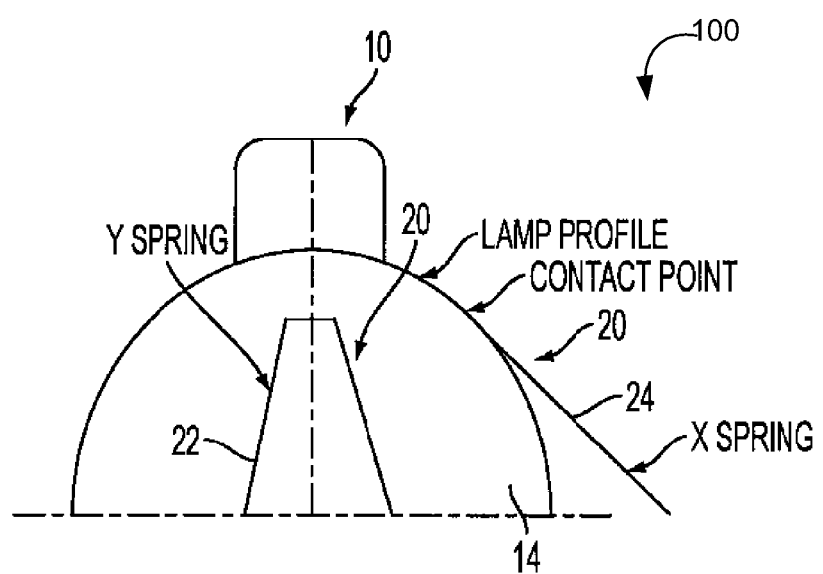
FIG. 3 is a schematic diagram of a retaining system.

FIGS. 1-3 are various views of an embodiment 100 of a retaining system 20 for retaining a replaceable part 10 within a device 12.

The following description is described in regards to retention of a replaceable light source, such as a lamp in an image display system. The retention mechanism may also be used for retention of a replaceable light source in other systems, including, computers, telephones, appliances, etc. Further, it should be appreciated that the retention mechanism described herein may be used for other replaceable components in other systems, including, but not limited to systems for retaining batteries, etc.

In the illustrated embodiments, the depicted replaceable part 10 is a light source for an image display device. The light source, may be any suitable lamp, such as a metal halide lamp or an ultra-high-pressure (UHP) arc lamp, and may be positioned within a reflector. When positioned in an image display device, the light source may be configured to direct most of the emitted light along a predetermined path.

Figure 9:
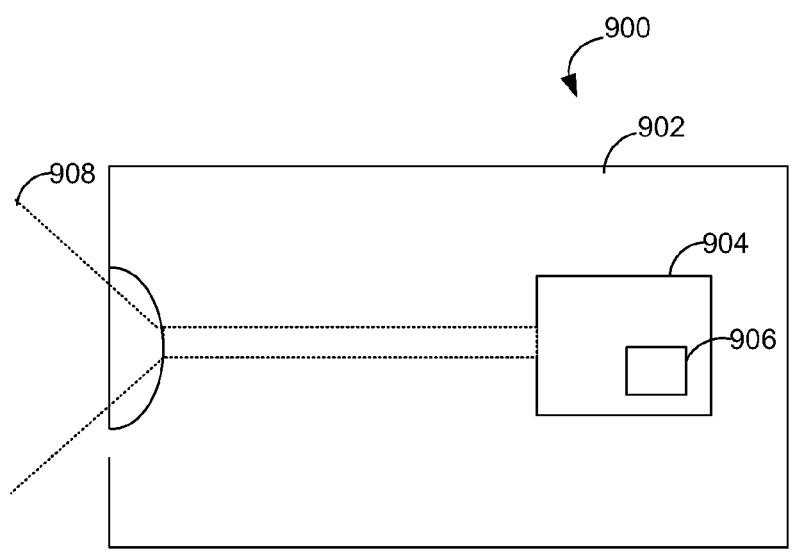
FIG. 9 is a schematic diagram depicting an image display system utilizing a retaining system according to the present disclosure.

As described and shown in FIG. 9, typically, an image display device includes a body or housing. Contained within the housing may be a light assembly, including one or more light sources linked to an image generation device, such as a light engine or optical engine. The light assembly may be adapted to produce one or more beams of light and project the light towards the image-generation device, which may be configured to generate and project an image. The light may be directed along a light path, through various projection lenses to a display surface.

The image-generation device may be configured to receive the light from light source and generate an image to be projected. The image-generation device may include an optical engine, image-producing element, filters, color wheels, lenses, mirrors, integrators, condensers, and other suitable optical elements. Such elements may be configured to generate an image. For example, the image generation device may include an image-producing element, such as, but not limited to, a digital micromirror (DMD), an LCD panel, or any other suitable image source. In some embodiments, the image-producing element may be configured to project light toward one or more lenses, mirrors or other optics, which, in turn, may be configured to project light toward the display surface.

Referring back to FIGS. 1-3, the light source may include a lamp within a reflector positioned in a display device lamp housing 12. The display device lamp housing may include a base and side wall(s). The system may be configured for replacement of the lamp from the display device lamp housing.

Retaining system 20 may include one or more retaining members which are configured to exert a retaining force on the replaceable part. As illustrated, the system may include a first retaining member 22 and a second retaining member 24 configured to exert a spring force against an outer portion of a reflector 14 of the lamp 10. The spring force may push the lamp 10 into an engagement position within the lamp housing 12.

As can be best seen in FIGS. 2 and 3, the first retaining member 22 and the second retaining member 24 include a retention arm 25. As shown, the retaining members are in the shape of a roughly trapezoidal or rectangular looped wire. The minimized retaining members engage the lamp reflector retaining it within the housing. The retaining members restrain the lamp along contact points applying force to the lamp reflector. The restraining members contact is minimized to reduce heat from the lamp to protect itself from annealing or transferring heat to plastic parts.

In one example, retention arms of the first retaining member 22 and the second retaining member 24 may be positioned at a right angle relative to each other. The retention arm 25 may include a first end 27 configured to be attached to the lamp housing 12 via a spring loaded hinge 31, where the spring loaded hinge 31 may be configured to bias the retaining member 22 towards a central axis (CX) of the lamp housing 12. The retention arm may include a second end that may be attached to another retaining member or otherwise positioned within to maintain position. The first and second retaining members 22 and 24 may each contact the reflector 14 via an end portion of the retaining member and each exerts a retention force against the lamp, such as a top hemispherical surface of the lamp. Therefore, if the lamp 10 is displaced toward either or both of the retaining members 22 and 24, the contact point at which the retaining members contact the lamp reflector 14 moves upwardly on the lamp reflector 14 (with reference to the lamp reflector orientation shown in FIG. 3).

As shown in FIG. 3, the retaining members may be considered as springs. Retaining member 22 may be considered a Y spring and retaining member 24 may be considered an X spring. Movement of the lamp within the lamp housing may be restrained by the combination of the retaining members.

Figure 4:
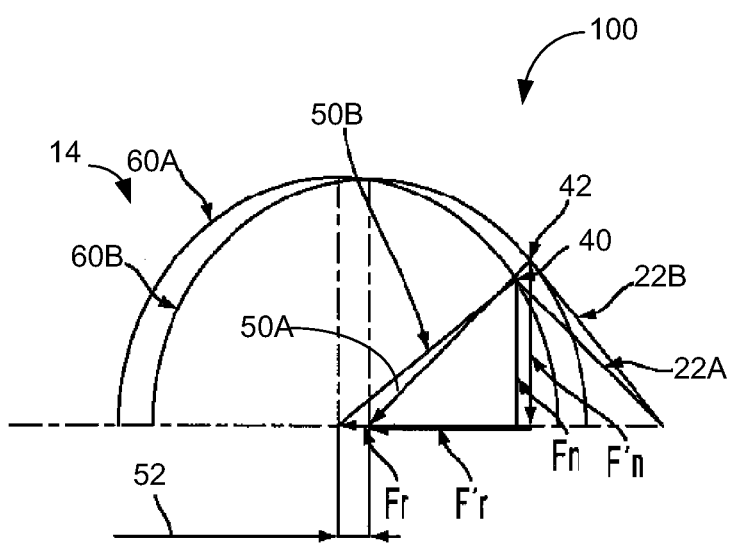
FIG. 4 is a schematic diagram depicting forces exerted by the first embodiment of the retaining system on the replaceable part when the replaceable part is held in an undisplaced position and a displaced position.

FIG. 4 shows vector diagrams that illustrate the components of the retention force 50 exerted by one of retaining members 22 and 24 against lamp reflector 14 when the lamp 10 is in an undisplaced position (i.e. desired engagement position) 60A and when the lamp 10 is displaced towards the retaining member 22 and/or 24 in a displaced position 60B. For the purposes of clarity, only the retaining member 22 is shown. However, it will be appreciated that the discussion may also apply to the retaining member 24.

The contact point of the retaining member 22 against the lamp reflector 14 when the lamp reflector 14 is in the undisplaced position is shown in FIG. 4 at contact point 40. In the displaced position, the contact point is indicated at 42. The locations of the retaining member 22 before and after displacement are shown at 22A and 22B, respectively. As illustrated, the retaining member has been lifted such that the angle is increased from the horizontal during displacement.

The retention force F may include a normal force indicated as $F_n$ and $F_r$ which is the force that pushes the lamp back from displacement. Force vectors representing the retention force of the retaining member 22 on the lamp reflector 14 at the original (undisplaced) position are shown by $F_r$ and $F_n$, and force vectors representing the force of the retaining member 22 on the lamp reflector 14 at the displaced position are shown by $F'_r$ and $F'_n$.

As shown in FIG. 4, the magnitude of the force $F_n$ normal to the direction of the displacement is larger at the displaced position ($F'_n$) 50B than at the undisplaced position ($F_n$) 50A. This decrease in the magnitude of the normal force $F_n$ may result from the shape of the lamp reflector 14, such as a curved shape, in particular a hemispherical shape as shown in this example. When the contact point of the retaining member 22 moves upwardly along the lamp reflector 14 due to a displacement 52 of the lamp 10 toward the retaining member, the retaining member 22 contacts the lamp reflector 14 at a location where the slope of the lamp reflector is closer to parallel with the surface along which the lamp is displaced (i.e. the horizontal surface in FIG. 4). This may increase the magnitude of the normal force vector relative to the radial force vector $F'_r$ (i.e. the vector along the direction of displacement). Because the magnitude of the normal force vector $F'_n$ is greater than that of $F_n$, the frictional force between lamp 10 and the surface along which the lamp was displaced is increased. This increased frictional force may cause the lamp 10 to resist being returned to its undisplaced position (engagement position) by the retaining members 22 and 24. Likewise, the radial force $F'_r$ at the displaced position may be lower than the radial force $F_r$ at the undisplaced position. Thereby, the retention force opposing displacement of the lamp 10 may be lower when the lamp 10 is in the displaced position 50B than the retention force when the lamp 10 is in the undisplaced position 50A.

Figure 5:
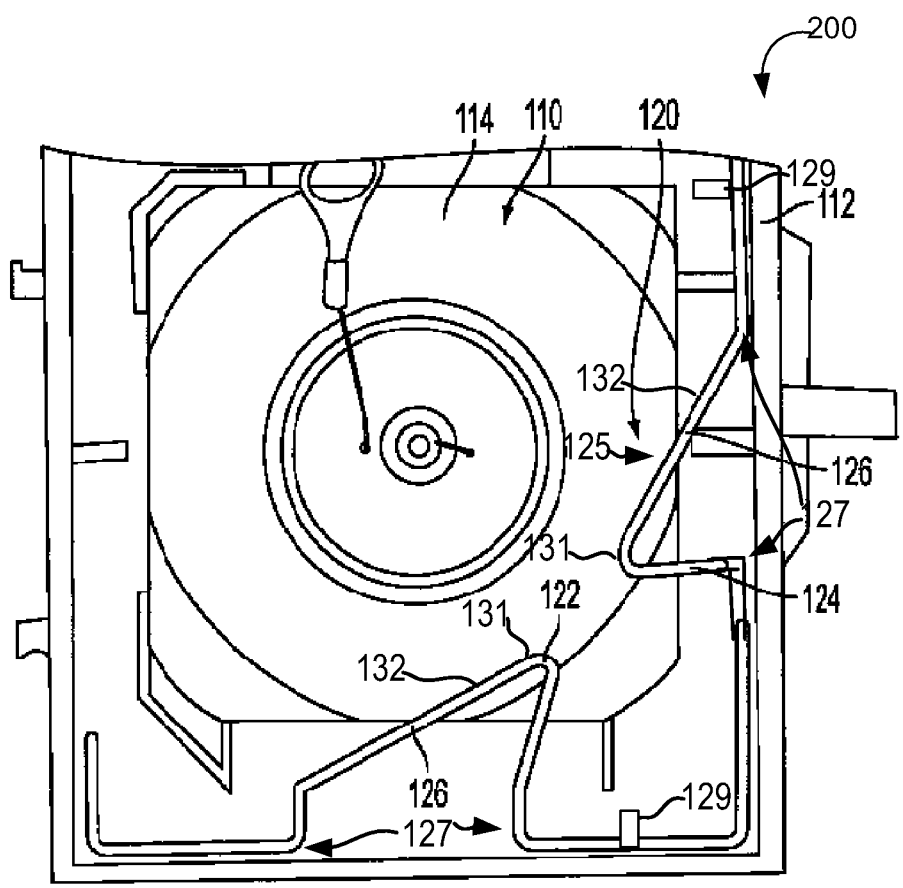
FIG. 5 is a rear view of a second embodiment of the retaining system for retaining a replaceable part held within a device.
Figure 6:
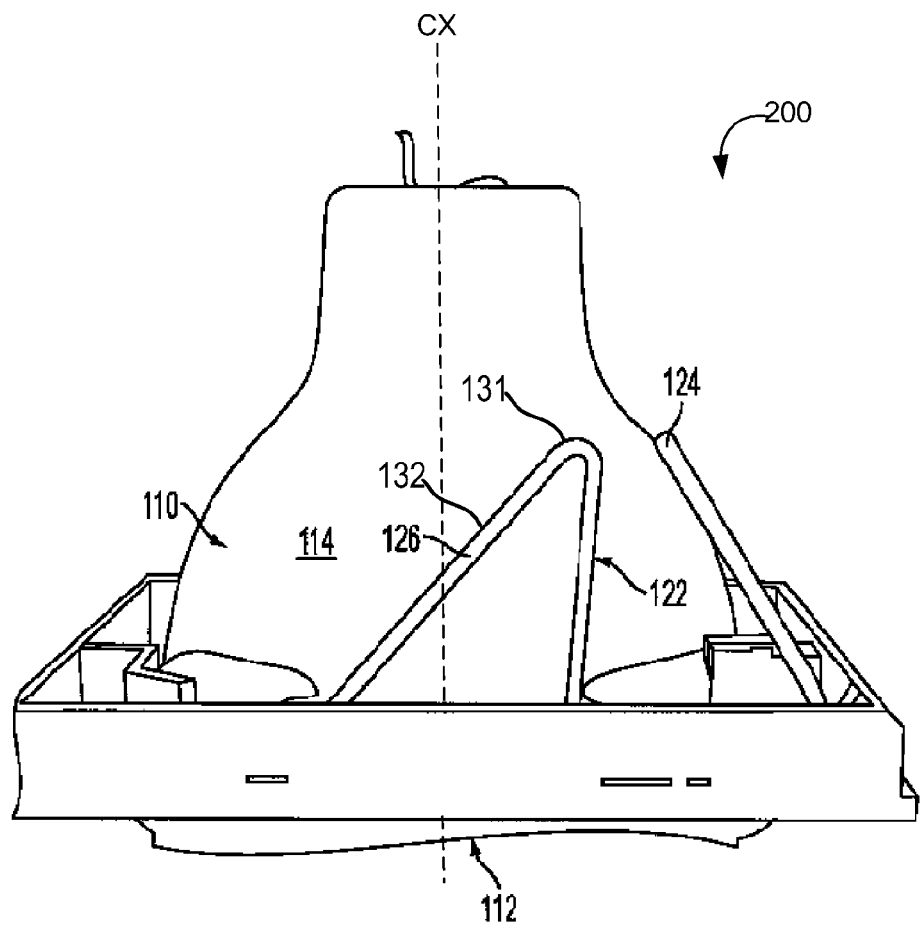
FIG. 6 shows a side perspective view of another embodiment of the retaining system.
Figure 7:
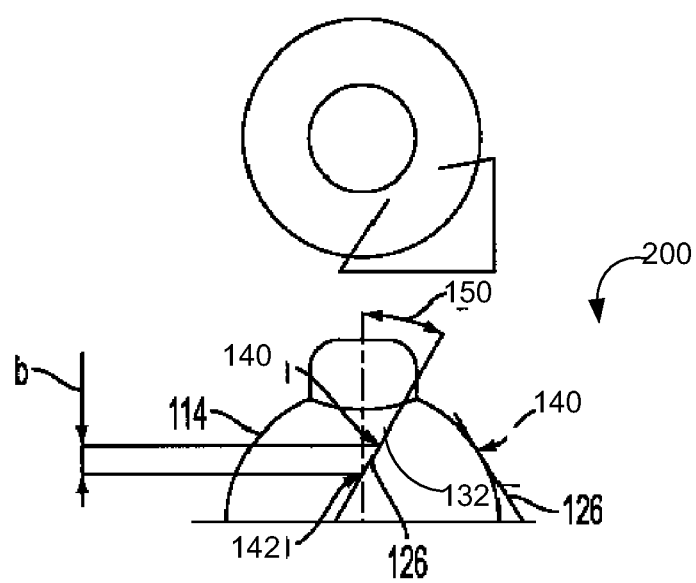
FIG. 7 is a schematic diagram of an embodiment of the retaining system.

FIGS. 5-7 illustrate a second embodiment 200 of a retaining system 120 for retaining a replaceable part 110 within a device 112. In this system, the frictional force opposing the return of a replaceable part from a displaced position to an undisplaced position is reduced.

As with the embodiment of FIGS. 1-4, the depicted replaceable part 110 comprises a lamp 110, and the depicted device 112 comprises a image display device lamp housing 112 having a base and side wall(s) defining a cavity for receiving at least a bottom portion of the replaceable part 110.

Retaining system 120 may include a first retaining member 122 and a second retaining member 124. First and second retaining members 122 and 124 may be configured to exert a spring force against an outer portion of a reflector 114 of the lamp 110, thereby pushing the lamp 110 into a desired location in the lamp housing 112. As can best be seen in FIGS. 5 and 6, the first retaining member 122 and the second retaining member 124 include a retention arm 126 with a looped wire formed roughly in the shape of a triangle with a diagonally oriented side or member 127.

In the illustrated embodiment, the retaining members are in a reflective orientation with one retaining member facing a first direction and the second retaining member facing a second direction. Thus, each retaining member may be considered to have a substantially vertical or perpendicular leg and a hypotenuse diagonal leg. Two retaining members may be provided such that each retaining members vertical leg faces toward the vertical leg of the other retaining member such that the force application is complementary. The diagonal legs may face outwards. Although illustrated with this reflective configuration, it should be appreciated that the two retaining members may be otherwise positioned, such as in the same orientation.

In the illustrated embodiment, the diagonal leg is shown with an approximately 45 degree angle extension from the vertical leg. This angle may be varied in alternate embodiments, for example, the diagonal leg may extend from the vertical leg at approximately 30 degrees, 60 degrees, etc.

The corresponding retention arms 126 of the first retaining member 122 and the second retaining member 124 may be positioned at a right angle relative to each other. The retention arm 126 may include ends 127 configured to be attached to the lamp housing 112 via a spring loaded hinge 129, where the spring loaded hinge 129 may be configured to bias the retaining member 122 towards a central axis (CX) of the lamp housing 112. The retention arm 126 may include a second end 131 that is a free end free from any attachment. The retention arm 126 is configured to contact the lamp reflector 114 at a location along a length of the diagonally-oriented member 132, rather than at an end, exerting a retention force against a top hemispherical surface of the lamp 110. Further, if the lamp 110 is displaced toward either or both of the retaining members 122 and 124, the contact point at which retention arm 126 contacts reflector 114 moves downwardly on the lamp reflector 114.

FIG. 7 shows the movement of the contact point on the diagonally-oriented member 132 of the retaining member 12 as the lamp 110 is displaced from the undisplaced position (engagement position) to a displaced position. The contact point of retention arm 126 against lamp reflector 114 when the reflector is in the undisplaced position is shown in FIG. 7 at original contact point 140, and the contact point of the retaining member 122 against the lamp reflector 114 when the lamp reflector 114 is in the displaced position is shown in FIG. 7 at the displaced contact point 142. The retaining member, here the Y spring, assists in restoring the lamp from the displacement position. When displacement occurs, the retaining member changes its contact point from the original contact point 140 to the displaced contact point 142, where the movement is indicated at 150. For example, in some embodiments, this movement may reduce the friction force to the contact point where the bottom surface of the base, such as a plastic base, that supports the bottom edge of the lamp.

Figure 8:
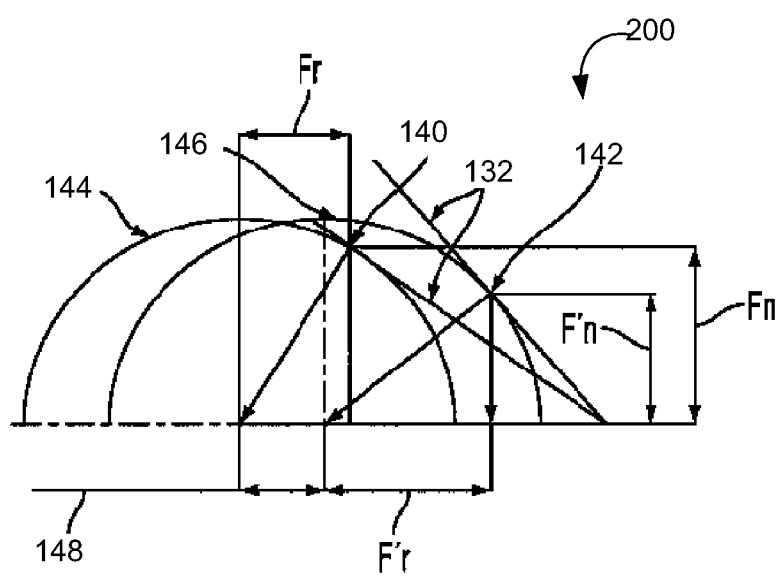
FIG. 8 is a schematic diagram depicting forces exerted by the second embodiment of the retaining system on the replaceable part when the replaceable part is held in an undisplaced position and a displaced position.

FIG. 8 shows vector diagrams that illustrate the components of the force applied by one of retaining members 122 and 124 against lamp reflector 114 when lamp 110 is in an undisplaced (i.e. desired engagement position) position and when lamp 110 is displaced toward the retaining member 122 and/or 124. For purposes of clarity, only the retaining member 122 is shown. However, it will be appreciated that the discussion may also apply to retaining member 124.

The contact point of retention arm 126 against lamp reflector 114 when the reflector is in the undisplaced position is shown in FIG. 8 at original contact point 140, and the contact point of the retaining member 122 against the lamp reflector 114 when the lamp reflector 114 is in the displaced position is shown in FIG. 8 at displaced contact point 142. The locations of the retaining member 122 before and after displacement are shown at 144 and 146, respectively. Force vectors representing the force of the retaining member 122 on lamp reflector 114 at the original (undisplaced) position are shown by $F_r$ and $F_n$, and force vectors representing the force of the retaining member on lamp reflector 114 at the displaced position are shown by $F'_r$ and $F'_n$.

As shown in FIG. 8, and as opposed to the first embodiment of the retaining system shown in FIGS. 1-4, displaced contact point 142 between the diagonally-oriented member 132 of the retaining member 122 is lower on the curvature of the lamp reflector 114 than contact point 144. As a result, the magnitude of the force $F_n$ normal to the direction of the displacement is smaller at the displaced position ($F'_n$) than at the undisplaced position ($F_n$). Further, the magnitude of the force $F_r$ along the direction of displacement 148 is larger at displaced contact point 142 than at the original contact point 140. The effect of this on the return of lamp 110 to the original (undisplaced) position may be twofold. First, the frictional force between lamp 110 and the surface along which the lamp was displaced may be decreased due to the decreased magnitude of the normal force $F'_n$ at "contact point 1" 140. Second, the force $F_r$ opposing the displacement may increased at "contact point 2" 142, thereby helping to return the lamp 110 from the displaced position 146 to the undisplaced position (engagement position) 144. In this manner, the embodiment of FIGS. 5-8 may help to improve the ease with which a displaced lamp is returned to a desired position (engagement position) 144 relative to the first embodiment of the retaining system as shown in FIGS. 1-4 while still retaining minimal stress on the lamp and enabling restoration from a displacement position.

Thus, in this embodiment, in contrast to the embodiment shown in FIGS. 1-4, the friction force does not increase during the displacement. Specifically, in FIGS. 1-4, when there is a lamp displacement in the X direction away from the engagement position, the original contact point of the retaining member will move to a displaced contact point. Force decomposition changed that normal force increased when the displacement occurred, and since the normal force increased the friction force also increased. The increased friction force may result in a tendency of the retaining member to lift the lamp up from the housing base slightly and the X and Y spring may act as a friction force to each other. In contrast, in the second embodiment, the lamp displacement resulting in change in the original contact point to a displaced contact point where the normal force from displacement is reduced and therefore the resistance (normal force by friction coefficient of material) is also reduced. Thus, $F_r$ is greater in the displaced position such that the force to push the lamp back is increased.

FIG. 9 shows an image display device 900 configured to project an image 908 that utilizes a retaining system according to the present disclosure. The image display device 900 may include a body 902, a lamp housing 904, and a retaining system 906 coupled to the lamp housing 906. The retaining system may include one or more contacting members configured to provide sufficient retainment force to restore the lamp into position after a displacement event.

It is believed that the disclosure set forth above encompasses multiple distinct inventions with independent utility. While each of these inventions has been disclosed in its example embodiments, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein.

Inventions embodied in various combinations and subcombinations of features, functions, elements, and/or properties may be claimed in a related application. Such claims, whether they are directed to a different invention or directed to the same invention, whether different, broader, narrower or equal in scope to any original claims, are also regarded as included within the subject matter of the inventions of the present disclosure.

The invention claimed is:

1. A retaining system for retaining a replaceable part to a desired location within a housing, the housing defining perpendicular X, Y, and Z directions, and comprising a first edge disposed substantially in a Y-Z plane and a second edge disposed substantially in an X-Z plane, the system comprising:
   a first retaining member disposed near the first edge of the housing and comprising thin elongate legs, each leg extending substantially in a straight line, wherein the straight lines defined by the legs of the first retaining member together define a shape with components in all of the X, Y, and Z directions, the first retaining member being configured to bias the part in the X and Z directions, such that when the part is displaced outwards from the desired location in the X direction, the first retaining member increases the biasing force inwards in the X direction; and
   a second retaining member disposed near the second edge of the housing and comprising thin elongate legs, each leg extending substantially in a straight line, wherein the straight lines defined by the legs of the second retaining member together define a shape with components in all of the X, Y, and Z directions, the second retaining member being configured to bias the part in the Y and Z directions, such that when the part is displaced outwards from the desired location in the Y direction, the second retaining member increases the biasing force inwards in the Y direction; wherein
   each retaining member comprises a thin elongated member comprising bends to thereby define a loop;
   the loop defined by each member lies substantially in a single plane; and
   each loop comprises two end points at the respective edge of the housing, and wherein the loop and an imaginary line drawn between the end points substantially defines a polygon.

2. The retaining system of claim 1, wherein the first retaining member is further configured such that when the part is displaced outwards from the desired location in the X direction, the first retaining member decreases the biasing force in the Z direction, and wherein the second retaining member is further configured such that when the part is displaced outwards from the desired location in the Y direction, the second retaining member decreases the biasing force in the Z direction.

3. The retaining system of claim 1, wherein each polygon comprises a triangle or quadrilateral.

4. The retaining system of claim 1, wherein the first retaining member comprises a first leg that extends in the X and Z directions, and is at a substantially constant position in the Y direction, and a second leg connected to a distal end of the first leg and extending diagonally, and wherein the second retaining member comprises a third leg that extends in the Y and Z directions, and is at a substantially constant position in the X direction, and a fourth leg connected to a distal end of the third leg and extending diagonally.

5. The retaining system of claim 4, wherein the first leg extends parallel to the second edge while the second leg extends from a point of the first leg away from the second edge of the housing, and
   the third leg extends parallel to the first edge while the fourth leg extends from a point of the third leg away from the first edge of the housing.

6. The retaining system of claim 4, wherein the first and second legs define a first acute angle therebetween, and the third and fourth legs define a second acute angle therebetween.

7. The retaining system of claim 6, wherein the first acute angle is approximately 45° and wherein the second acute angle is approximately 45°.

8. The retaining system of claim 1, wherein the replaceable part comprises a lamp.

9. An image display device, comprising:
   a housing defining perpendicular X, Y, and Z directions, and comprising a first edge disposed substantially in a Y-Z plane and a second edge disposed substantially in an X-Z plane; and
   a retaining system for retaining a lamp to a desired location within the housing, the retaining system comprising:
      a first retaining member disposed near the first edge of the housing and comprising thin elongate legs, each leg extending substantially in a straight line, wherein the straight lines defined by the legs of the first retaining member together define a shape with components in all of the X, Y, and Z directions, the first retaining member being configured to bias the lamp in the X and Z directions, such that when the lamp is displaced outwards from the desired location in the X direction, the first retaining member increases the biasing force inwards in the X direction; and
      a second retaining member disposed near the second edge of the housing and comprising thin elongate legs, each leg extending substantially in a straight line, wherein the straight lines defined by the legs of the second retaining member together define a shape with components in all of the X, Y, and Z directions, the second retaining member being configured to bias the lamp in the Y and Z directions, such that when the lamp is displaced outwards from the desired location in the Y direction, the second retaining member increases the biasing force inwards in the Y direction, wherein
   each retaining member comprises a thin elongated member comprising bends to thereby define a loop;
   the loop defined by each member lies substantially in a single plane; and
   each loop comprises two end points at the respective edge of the housing, and wherein the loop and an imaginary line drawn between the end points substantially defines a polygon.

10. The image display device of claim 9, wherein the first retaining member is further configured such that when the part is displaced outwards from the desired location in the X direction, the first retaining member decreases the biasing force in the Z direction, and wherein the second retaining member is further configured such that when the part is displaced outwards from the desired location in the Y direction, the second retaining member decreases the biasing force in the Z direction.

11. The image display device of claim 9 wherein each polygon comprises a triangle or quadrilateral.

12. The image display device of claim 9 wherein the first retaining member comprises a first leg that extends in the X and Z directions, and is at a substantially constant position in the Y direction, and a second leg connected to a distal end of the first leg and extending diagonally, and wherein the second retaining member comprises a third leg that extends in the Y and Z directions, and is at a substantially constant position in the X direction, and a fourth leg connected to a distal end of the third leg and extending diagonally.

13. The retaining system of claim 12, wherein the first leg extends parallel to the second edge while the second leg extends from a point of the first leg away from the second edge of the housing, and the third leg extends parallel to the first edge while the fourth leg extends from a point of the third leg away from the first edge of the housing.

14. The retaining system of claim 12, wherein the first and second legs define a first acute angle therebetween, and the third and fourth legs define a second acute angle therebetween.

15. The retaining system of claim 14, wherein the first acute angle is approximately 45° and wherein the second acute angle is approximately 45°.

* * * * *